(No Model.)
M. L. MOODY.
WHIFFLETREE.
No. 524,723.                   Patented Aug. 21, 1894.
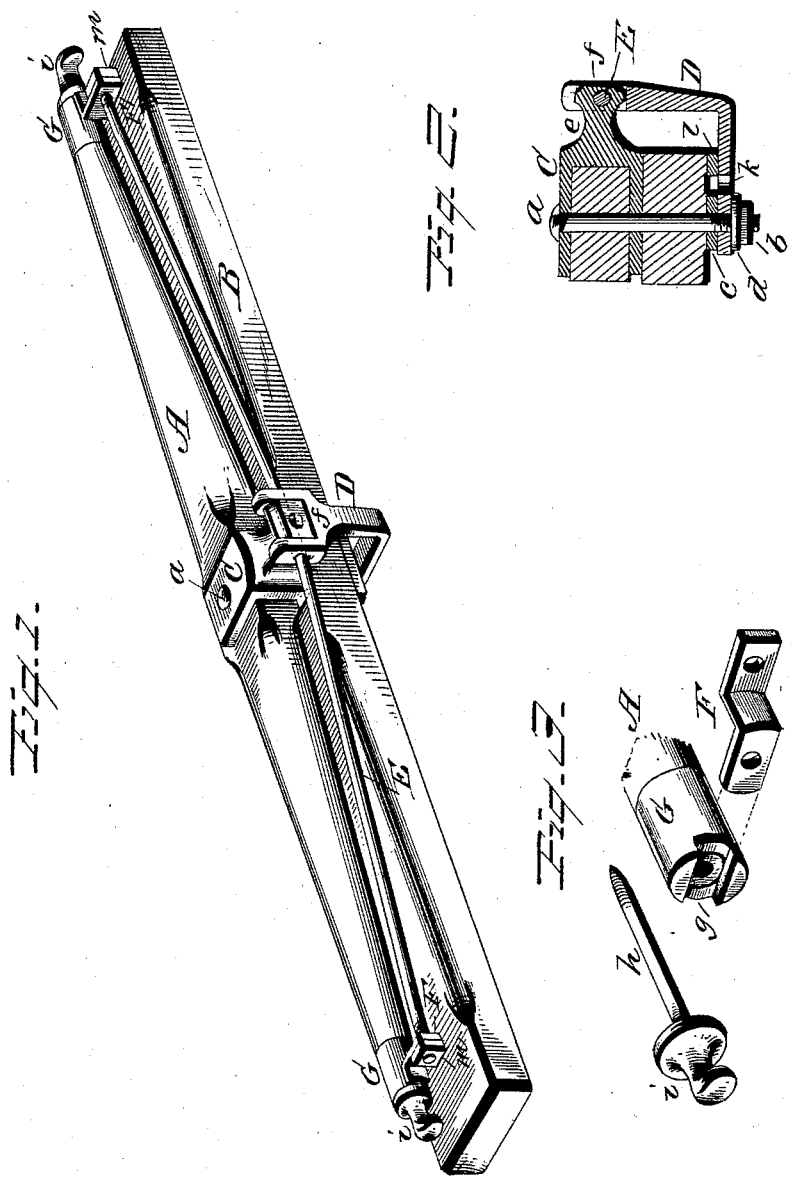
Witnesses
C. J. Williamson
Wm Gordon
Inventor
Manville L. Moody,
per Chas. H. Fowler.
Attorney.

UNITED STATES PATENT OFFICE.

MANVILLE LOTHAIR MOODY, OF PHILIPSBURG, MONTANA.

WHIFFLETREE.

SPECIFICATION forming part of Letters Patent No. 524,723, dated August 21, 1894.

Application filed January 13, 1894. Serial No. 496,714. (No model.)

*To all whom it may concern:*

Be it known that I, MANVILLE LOTHAIR MOODY, a citizen of the United States, residing at Philipsburg, in the county of Deer Lodge and State of Montana, have invented certain new and useful Improvements in Whiffletrees; and I do hereby declare that the following is a full, clear, and exact description of the same, reference being had to the annexed drawings, making a part of this specification, and to the letters of reference marked thereon.

The present invention has relation to the construction of whiffletrees, such as single, double, and tripletrees, and like devices, and has for its object to materially improve the construction whereby greater strength and durability are obtained and the value of such a device materially enhanced.

The invention consists in a whiffletree constructed substantially as shown in the drawings and hereinafter described and claimed.

Figure 1 of the drawings represents a perspective view of my improved device; Fig. 2 a central transverse section thereof; Fig. 3 a detail view in perspective showing the end of the whiffletree and its connections removed therefrom.

In the accompanying drawings A represents the whiffletree and B the cross-bar to which it is connected, both of which may be of the usual construction.

The whiffletree has connected to it a clip C, which clip embraces the whiffletree and the two are connected together by a screw bolt $a$. The screw bolt has threads upon its lower end, extends down through a hole in a bracket D, and a nut $b$ engages with the screw threaded end of the bolt which holds the bracket up against the under side of the cross-bar. A washer $c$ is interposed between the bracket D and cross-bar B and a second washer $d$ is placed between the screw-nut $b$ and under side of said bracket, the bolt $a$ serving as a pivot for both the whiffletree and bracket when turning. The bracket D has a forked end $f$ which projects upwardly and with which engages the shank $e$ of the clip C. The shank of the clip is held in engagement with the forked end of the clip by means of a truss-rod E which passes through holes therein. This truss-rod is nearly the full length of the whiffletree and is screw threaded upon its ends, which ends extend through holes in brace-plates F and nuts engage with the screw threaded ends of the rod whereby it may be tightened up as circumstances require. Upon the ends of the whiffletree are thimbles G which thimbles have grooves $g$ to receive the ends of the brace-plates F, said plates being held therein by the screws $h$ having the usual heads $i$ with which the ends of the traces engage.

To adapt the bracket D to the relative position of the clip C and the cross-bar, the bracket may be rendered adjustable by means of hole $k$ therein with which the screw-bolt may engage.

Any suitable form of clip and bracket may be used and if desired a friction-plate $l$ may be connected to the under side of the cross bar for the bracket to come in contact, and the washer $c$ may also serve as a friction-plate.

The whiffletree is perfectly braced and strengthened and is prevented from turning forward, the truss-rod which also serves as a tension-rod adds strength and durability to the device and renders it more serviceable.

I claim—

The whiffletree A, the thimbles G upon the ends thereof having grooves $g$, the double angle brace-plates F seated in the grooves of the thimbles, the clip C and adjustable bracket D, and the truss rod E forming a pivotal connection between the clip and bracket and connected at its ends to the double angle brace-plates, substantially as and for the purpose set forth.

In testimony that I claim the above I have hereunto subscribed my name in the presence of two witnesses.

MANVILLE LOTHAIR MOODY.

Witnesses:
WILLIAM RAY,
DAVID M. DURFEE.